(12) United States Patent
Iyer et al.

(10) Patent No.: US 8,868,955 B2
(45) Date of Patent: Oct. 21, 2014

(54) ENHANCED INTERCONNECT LINK WIDTH MODULATION FOR POWER SAVINGS

(75) Inventors: Venkatraman Iyer, Austin, TX (US);
Robert G. Blankenship, Tacoma, WA (US); Dennis R. Halicki, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 545 days.

(21) Appl. No.: 13/175,794

(22) Filed: Jul. 1, 2011

(65) Prior Publication Data

US 2013/0007491 A1    Jan. 3, 2013

(51) Int. Cl.
*G06F 1/32* (2006.01)

(52) U.S. Cl.
CPC ............ *G06F 1/3287* (2013.01); *G06F 1/3206* (2013.01); *G06F 1/3243* (2013.01)
USPC .......................................... 713/330; 710/307

(58) Field of Classification Search
CPC .............................. G06F 1/3253; G06F 1/3287
USPC .......................................... 710/307; 713/330
See application file for complete search history.

(56) References Cited

U.S. PATENT DOCUMENTS

| | | | |
|---|---|---|---|
| 5,396,635 A | 3/1995 | Fung | |
| 5,781,784 A | 7/1998 | Mckinley | |
| 6,009,488 A | 12/1999 | Kavipurapu | |
| 6,222,825 B1 | 4/2001 | Mangin et al. | |
| 6,484,223 B1 | 11/2002 | Lenz | |
| 6,526,469 B1 | 2/2003 | Drehmel et al. | |
| 6,665,742 B2 | 12/2003 | Owen et al. | |
| 7,136,953 B1 | 11/2006 | Bisson et al. | |
| 7,188,263 B1 | 3/2007 | Rubinstein et al. | |
| 7,313,712 B2 | 12/2007 | Cherukuri et al. | |
| 7,418,005 B2 | 8/2008 | Arima | |
| 7,660,261 B2 | 2/2010 | Keromytis et al. | |
| 7,664,146 B1 | 2/2010 | Reches | |
| 8,046,488 B2 | 10/2011 | Cherukuri et al. | |
| 8,208,467 B2 * | 6/2012 | Kapil et al. ................... | 370/392 |
| 2002/0087716 A1 | 7/2002 | Mustafa | |
| 2002/0103945 A1 | 8/2002 | Owen et al. | |
| 2002/0112099 A1 | 8/2002 | Collier | |

(Continued)

FOREIGN PATENT DOCUMENTS

| | | |
|---|---|---|
| EP | 1 599 006 A1 | 11/2005 |
| JP | 4-359335 A | 12/1992 |

(Continued)

OTHER PUBLICATIONS

Office Action received for Chinese Patent Application No. 200410086986.5, mailed on Jun. 19, 2009, 5 pages of English Translation and 6 pages of Chinese Office Action.

(Continued)

*Primary Examiner* — Albert Wang
(74) *Attorney, Agent, or Firm* — Caven & Aghevli LLC (57) ABSTRACT

Methods and apparatus relating to enhanced interconnect link width modulation for power savings are described. In one embodiment, the width of a link is modified from a first width to a second width in response to a power management flit, while non-idle flits continue to be transmitted over the link after transmission of the power management flit. Other embodiments are also disclosed and claimed.

31 Claims, 9 Drawing Sheets

(56) References Cited

U.S. PATENT DOCUMENTS

| | | |
|---|---|---|
| 2003/0088799 A1 | 5/2003 | Bodas |
| 2003/0185308 A1 | 10/2003 | Schoenborn |
| 2003/0221026 A1 | 11/2003 | Newman |
| 2004/0128576 A1 | 7/2004 | Gutman et al. |
| 2004/0153952 A1 | 8/2004 | Sharma et al. |
| 2004/0264466 A1 | 12/2004 | Huang |
| 2005/0188232 A1 | 8/2005 | Weng et al. |
| 2005/0259599 A1 | 11/2005 | Cherukuri et al. |
| 2005/0259696 A1 | 11/2005 | Steinman et al. |
| 2005/0262284 A1 | 11/2005 | Cherukuri et al. |
| 2006/0015761 A1 | 1/2006 | Kwa et al. |
| 2006/0034295 A1 | 2/2006 | Cherukuri et al. |
| 2006/0034611 A1 | 2/2006 | Li |
| 2007/0239922 A1* | 10/2007 | Horigan .................. 710/307 |
| 2009/0276558 A1 | 11/2009 | Goma et al. |
| 2014/0095751 A1 | 4/2014 | Iyer et al. |

FOREIGN PATENT DOCUMENTS

| | | |
|---|---|---|
| JP | 8-223390 A | 8/1996 |
| JP | 2000-261435 A | 9/2000 |
| JP | 2001-022690 A | 1/2001 |
| JP | 2002-259327 A | 9/2002 |
| JP | 2003-037613 A | 2/2003 |
| WO | 2014/051765 A1 | 4/2014 |

OTHER PUBLICATIONS

Office Action received for Chinese Patent Application No. 2004100869865, mailed on Nov. 28, 2008, 4 pages of English Translation and 5 pages of Chinese Office Action.

Office Action received for Japanese Patent Application No. 2004-235926, mailed on Feb. 3, 2009, 9 pages of English Translation and 8 pages of Japanese Office Action.

Office Action received for Japanese Patent Application No. 2004-235926, mailed on Oct. 27, 2009, 6 pages of English Translation and 6 pages of Japanese Office Action.

Response to Office Action received for U.S. Appl. No. 11/155,857, filed on Mar. 30, 2009, 10 pages.

International Search Report and Written Opinion received for PCT Application No. PCT/US2006/024193, mailed on Feb. 1, 2007, 11 pages.

Office Action received for European Patent Application No. 04255079.8, mailed on Sep. 6, 2006, 10 pages.

Office Action received for European Patent Application No. 04255079.8, mailed on Nov. 28, 2008, 5 pages.

Office Action received for European Patent Application No. 04255079.8, mailed on Mar. 19, 2007, 4 pages.

PCI Express Base Specification, Revision 1.0, Jul. 22, 2002, Revised Version 1.0a on Apr. 15, 2003, pp. 1-8 and 165-189.

Search Report received for European Patent Application No. 04255079.8, mailed on Sep. 16, 2005, 3 pages.

Office Action received for U.S. Appl. No. 10/850,851, mailed on Feb. 4, 2009, 20 pages.

Office Action received for U.S. Appl. No. 10/850,851, mailed on Aug. 31, 2009, 27 pages.

Office Action received for U.S. Appl. No. 10/850,851, mailed on Feb. 2, 2010, 26 pages.

Office Action received for U.S. Appl. No. 10/850,851, mailed on Jul. 23, 2010, 21 pages.

Office Action received for U.S. Appl. No. 10/850,851, mailed on Dec. 15, 2010, 22 pages.

Ex Parte Quayle Action received for U.S. Appl. No. 10/850,851, mailed on May 23, 2011, 6 pages.

Notice of Allowance received for U.S. Appl. No. 10/850,851, mailed on Jun. 23, 2011, 6 pages.

Notice of Grant received for Chinese Patent Application No. 200410086986.5, mailed on Feb. 5, 2010, 1 page of English Translation and 2 pages of Chinese Notice of Grant.

Office Action received for Japanese Patent Application No. 2004-235926, mailed on Jan. 29, 2008, 4 pages of English Translation.

Office Action received for German Patent Application No. 112006001541.9, mailed on Oct. 29, 2008, 3 pages of English Translation and 3 pages of German Office Action.

Notice of Grant received for European Patent Application No. 04255079.8, mailed on Mar. 30, 2009, 6 pages.

International Search Report and Written Opinion received for PCT Patent Application No. PCT/US2013/047251, mailed on Oct. 18, 2013, 9 pages.

\* cited by examiner

ENHANCED INTERCONNECT LINK WIDTH MODULATION FOR POWER SAVINGS

FIELD

The present disclosure generally relates to the field of electronics. More particularly, some embodiments relate to enhanced interconnect link width modulation for power savings.

BACKGROUND

Computer systems are generally made up of components that may communicate with one another for various purposes. Links that interconnect computer components provide a mechanism for transferring data and each link may include a plurality of "lanes", where each lane transfers a bit of data in a given cycle. The number of lanes to be used during communication generally defines the link width which in turn effectively controls the bandwidth of the link. As such, wider links provide a larger bandwidth than narrower links. On the other hand, wider links tend to consume more power because of the additional circuitry that supports the additional lanes. Link width, however, typically does not change under conventional techniques and a link may be wider than necessary, resulting in excessive power consumption.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments. Various aspects of embodiments of the invention may be performed using various means, such as integrated semiconductor circuits ("hardware"), computer-readable instructions organized into one or more programs ("software") or some combination of hardware and software. For the purposes of this disclosure reference to "logic" shall mean either hardware, software, or some combination thereof.

Some of the embodiments discussed herein may provide for link width modulation that supports probes (e.g., electro-magnetic coupler probes), retraining (e.g., to ensure bit lock maintenance), equalization, and/or improved efficiency. In an embodiment, a protocol (e.g., based on timers) is disclosed that allows a link to be available for a longer period of time, while changing widths or enabling enhanced error detection capabilities (such as rolling CRC (Cyclic Redundancy Code)). Additionally, signaling on idle lanes may allow probes (such as electro-magnetic coupler probes) to initialize themselves before the lanes start carrying flits. Further, staggered differential DC tails (period of differential DC signaling on the lane towards end of the width transition), when lanes enter electrical idle, may be used to turn off circuits (e.g., equalizers) in a staggered manner. In one embodiment, the staggering may be performed to reduce power supply noise. Turning off equalization circuits/equalizers may prevent them from reacting to noise on idle lanes. An embodiment also specifies time limits (referred to as "retraining interval") on lanes staying idle so that bit lock is not lost on those lanes. Accordingly, application of one or more embodiments results in less power consumption during lower utilization of a computing system and without affecting or with limited effect on performance and/or availability.

As discussed herein, "L0" generally refers to link operating at full width (i.e., all lanes) in both directions, "L0s" generally refers to link operating at zero width (i.e., no lanes) in one direction, "L1" generally refers to link in zero width (i.e., no lanes) in both directions, and "L0p" generally refers to link operating at partial width (i.e., a reduced number of lanes) in one direction. Additionally, the basic unit of transfer over a link is referred to herein as a "flit" (which may be 80 bits in an embodiment, e.g., with 8 bits for error detection, 8 bits for link-layer header, and 64 bits for data, although other configurations may be used).

Figure 1:
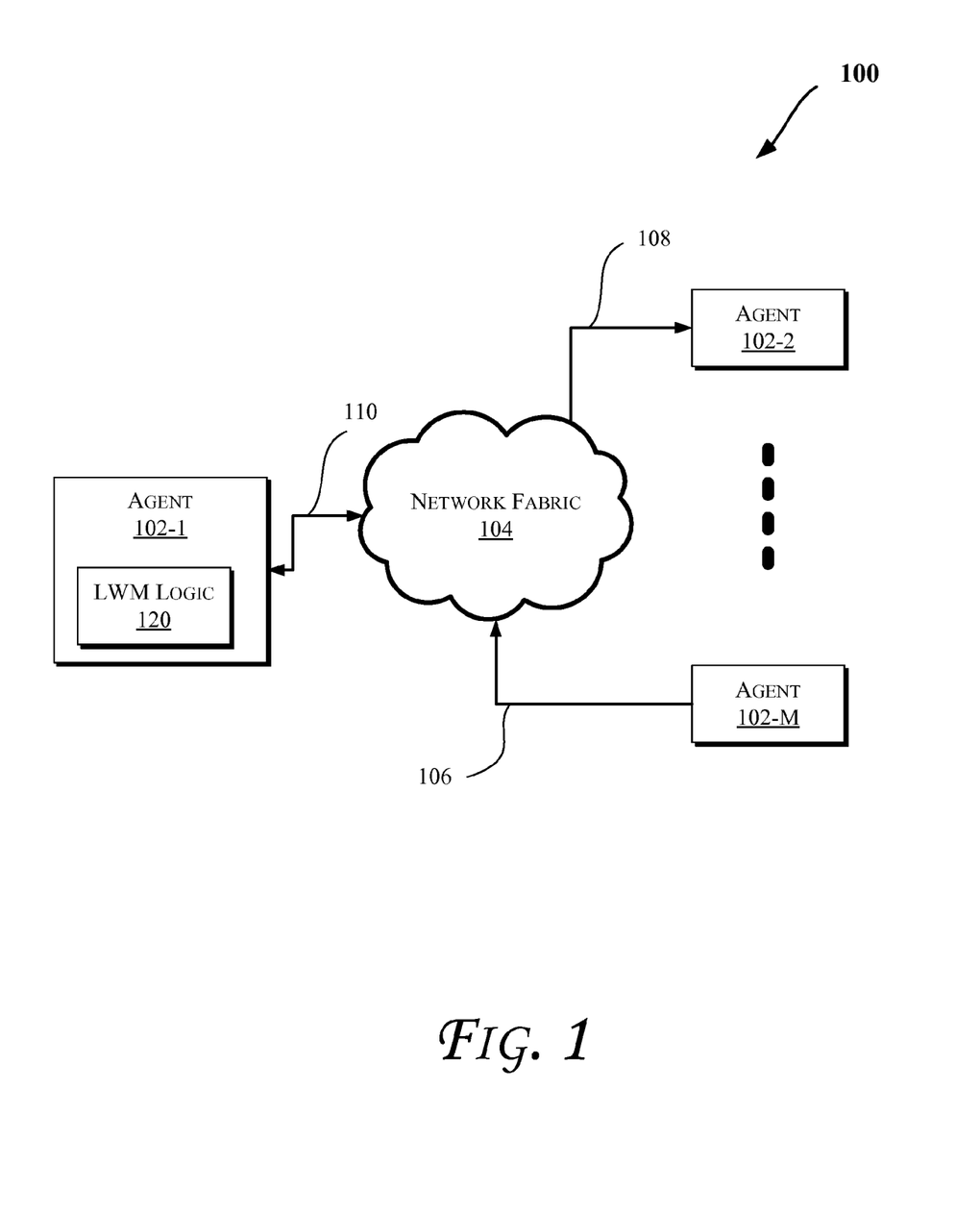
FIGS. 1-2 and 8-9 illustrate block diagrams of embodiments of computing systems, which may be utilized to implement various embodiments discussed herein.

Various embodiments are discussed herein with reference to a computing system component, such as the components discussed herein, e.g., with reference to FIGS. 1-2 and 8-9. More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In an embodiment, the agents 102 may be components of a computing system, such as the computing systems discussed with reference to FIGS. 2 and 8-9.

As illustrated in FIG. 1, the agents 102 may communicate via a network fabric 104. In an embodiment, the network fabric 104 may include one or more interconnects (or interconnection networks) that communicate via a serial (e.g., point-to-point) link and/or a shared communication network. For example, some embodiments may facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110).

Also, in accordance with an embodiment, one or more of the agents 102 may include a Link Width Modulation (LWM) logic 120. In some embodiments each CPU socket present in a computing system may include a LWM logic 120 as will be further discussed with reference to FIG. 2. for example.

Figure 2:
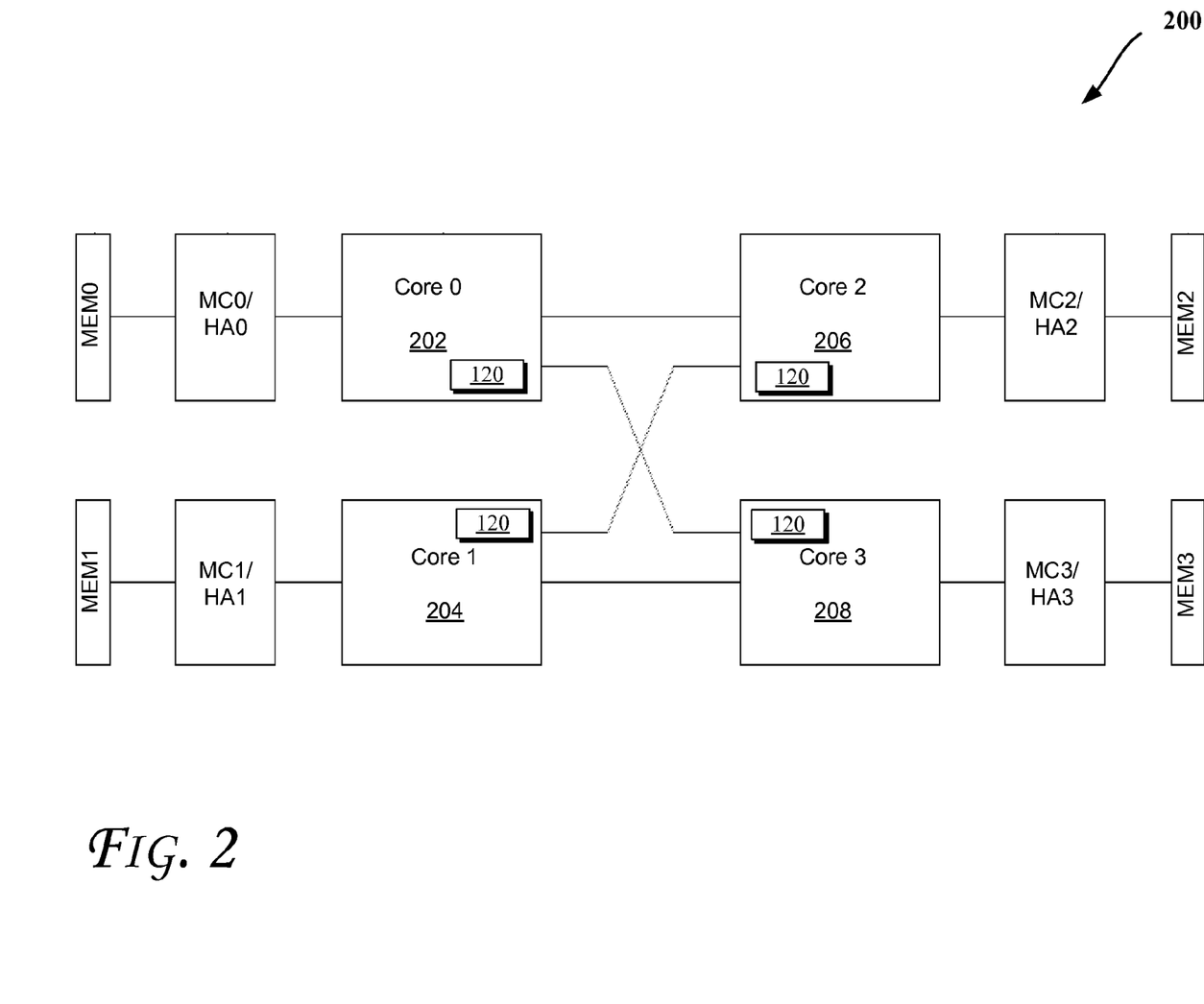

More specifically, FIG. 2 is a block diagram of a computing system 200 in accordance with an embodiment. System 200 may include a plurality of sockets 202-208 (four shown but some embodiments may have more or less socket). Each socket may include a processor and a LWM logic 120. Also, each socket may be coupled to the other sockets via a point-to-point (PtP) link, such as a Quick Path Interconnect (QPI). As discussed with respect the network fabric 104 of FIG. 1, each socket may be coupled to a local portion of system memory, e.g., formed of a plurality of Dual Inline Memory Modules (DIMMs) that may include dynamic random access memory (DRAM).

As shown in FIG. 2, each socket may be coupled to a memory controller (MC)/Home Agent (HA) (such as MC0/HA0 through MC3/HA3). The memory controllers may be coupled to a corresponding local memory (labeled as MEM0 through MEM3), which may be a portion of system memory (such as memory 812 of FIG. 8). In some embodiments, the memory controller (MC)/Home Agent (HA) (such as MC0/HA0 through MC3/HA3) may be the same or similar to agent 102-1 of FIG. 1 and the memory, labeled as MEM0 through MEM3, may be the same or similar to memory discussed with reference to any of the figures herein. Generally, processing/caching agents may send requests to a home node for access to a memory address with which a corresponding "home agent" is associated. Also, in one embodiment, MEM0 through MEM3 may be configured to mirror data, e.g., as master and slave. Also, one or more components of system 200 may be included on the same integrated circuit die in some embodiments.

An implementation such as shown in FIG. 2 thus may be for a socket glueless configuration with mirroring. For example, data assigned to a memory controller (such as MC0/HA0) may be mirrored to another memory controller (such as MC3/HA3) over the PtP links.

In some legacy systems, a complete link may be turned off to save power during idle periods. However, during periods of low utilization, it may be more efficient to operate the link at a lower width rather than shutting down the whole link (e.g., to reduce delay associated with restarting a link). To this end, an embodiment provides a protocol (e.g., based on timers) that allows a link to be available for a longer period of time, while changing widths. More specifically, FIGS. 3-6 illustrate timing diagrams in accordance with some embodiment of the invention.

As previously discussed, links that interconnect computer components provide a mechanism for transferring data and each link may include a plurality of "lanes", where each lane transfers a bit of data in a given cycle. The number of lanes to be used during communication generally defines the link width which in turn effectively controls the bandwidth of the link. In some embodiments, such as shown in FIGS. 3-6, 20 lanes may be used (e.g., for a QPI system; however, the embodiments are not limited to 20 lanes). Each lane may be a point-to-point data link.

Figure 3:
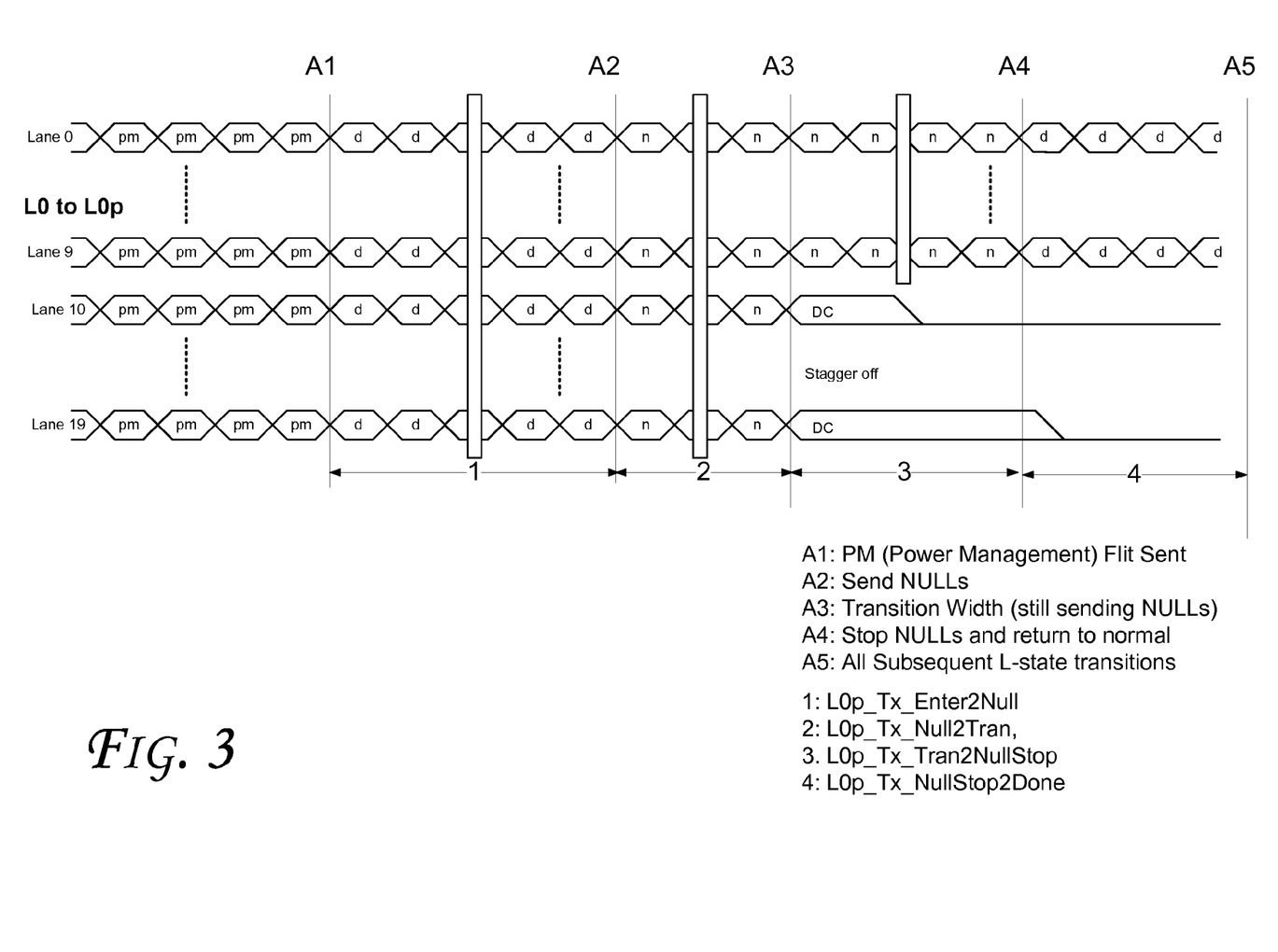
FIGS. 3-6 illustrate timing diagrams according to some embodiments.
Figure 4:
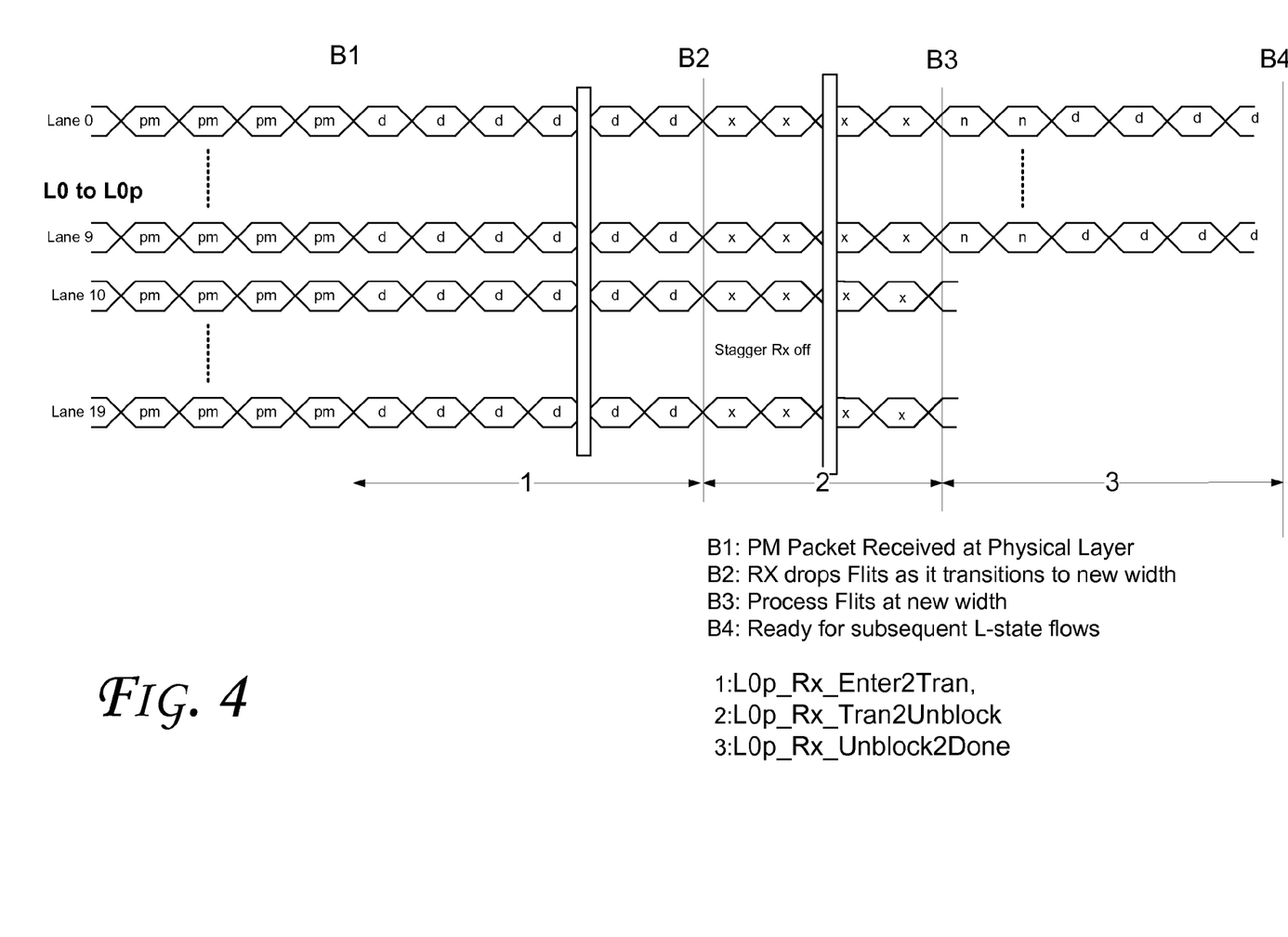
Figure 5:
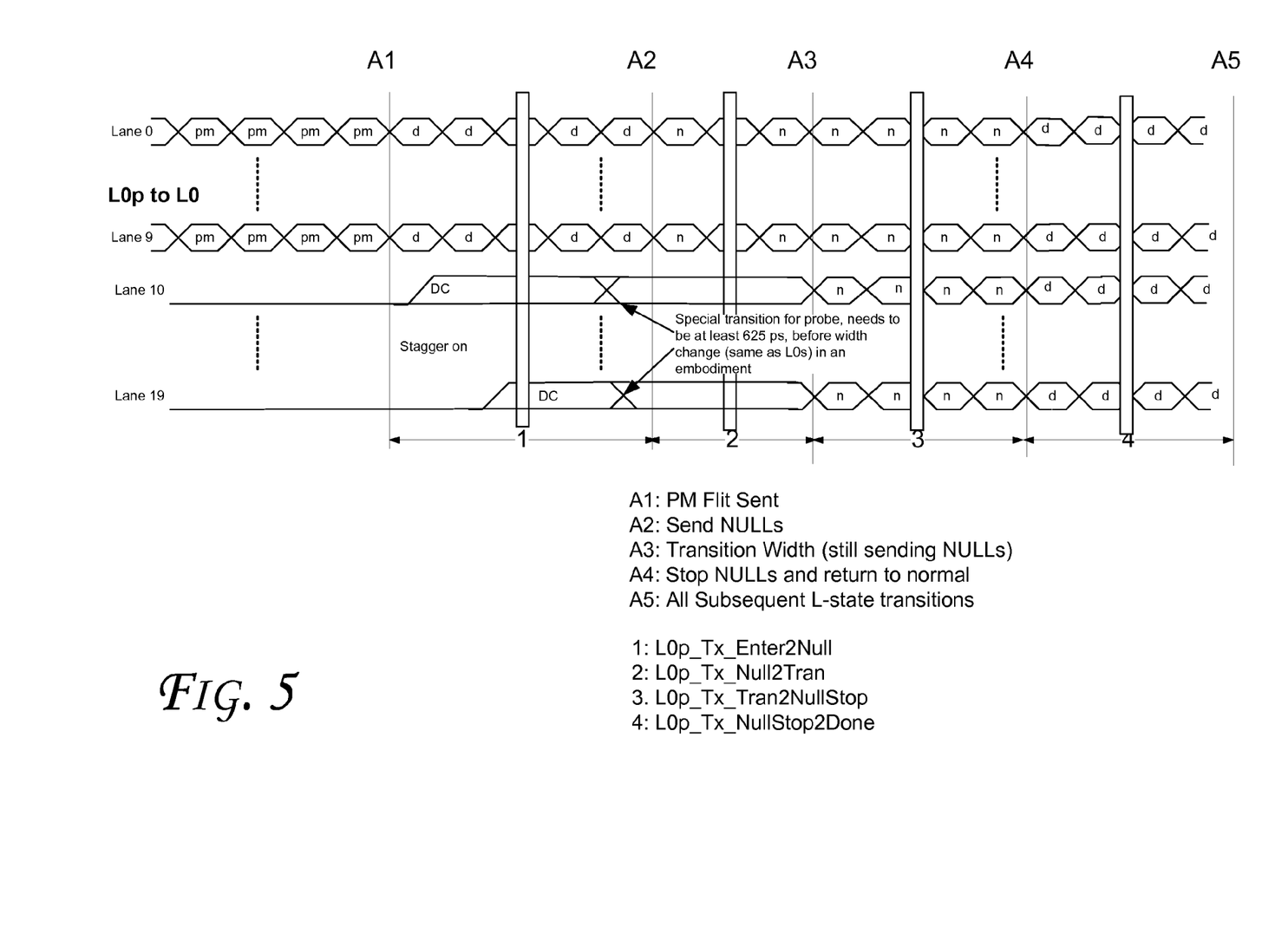
Figure 6:
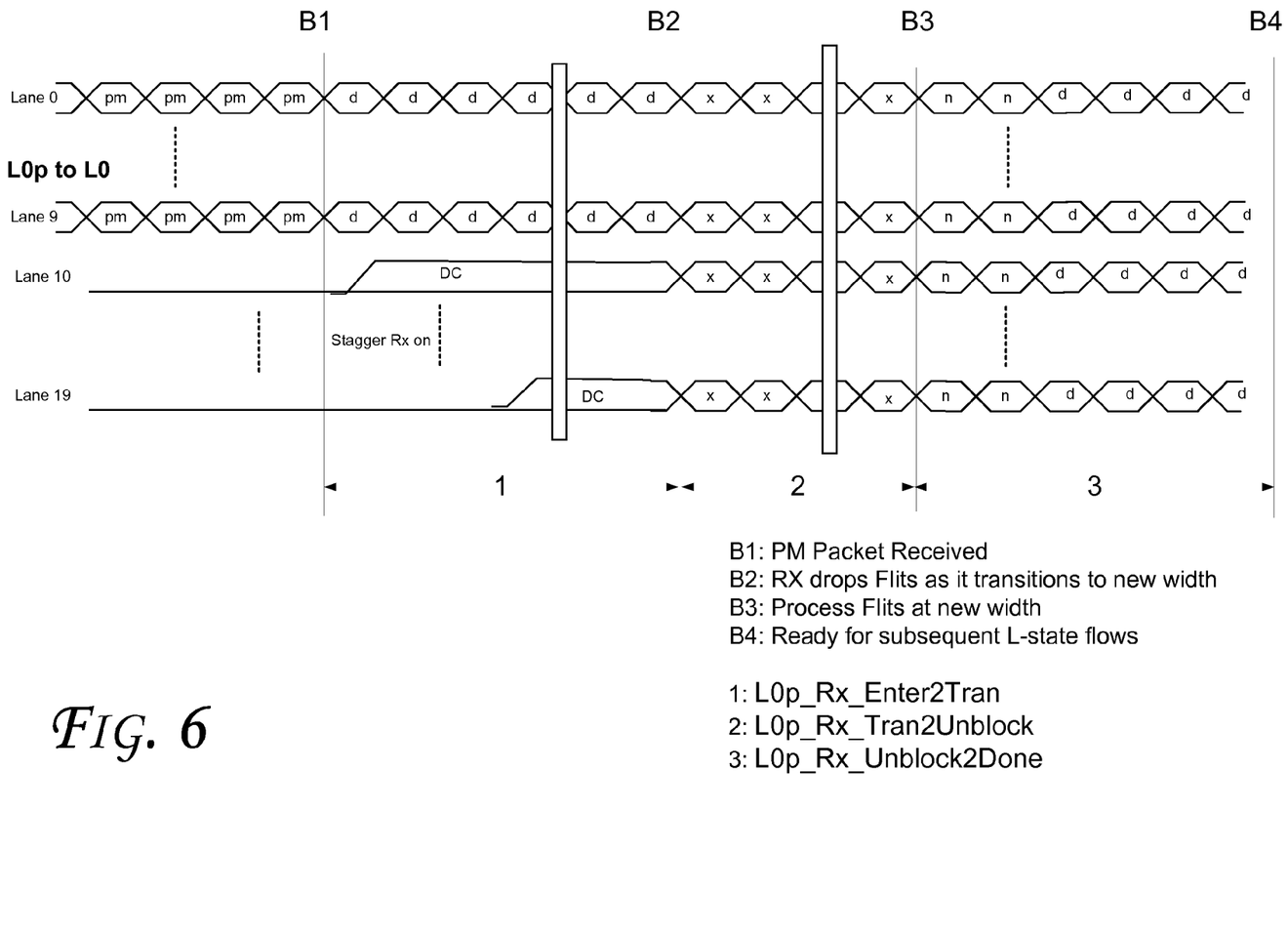

More specifically, FIGS. 3-4 illustrate timing diagrams for transition from L0 state to L0p state, at a transmitter (FIG. 3) and a receiver (FIG. 4), respectively. FIGS. 5-6 illustrate timing diagrams for transition from L0p state to L0 state, at a transmitter (FIG. 5) and a receiver (FIG. 6), respectively. Legends in FIGS. 3-6 refer to transition points A1 through B4 and sample commands (numerically labeled 1 to 4) that initiate various state changes. For example, L0p_Tx_Enter2Null refers to timer for end of PM flits to start of null flits at transmitter, L0p_Tx_Null2Tran refers to timer for start of null flits to end of null flits at idle lanes at transmitter, L0p_Tx_Tran2NullStop refers to timer for end of null flits at idle lanes to end of null flits at active lanes at transmitter, L0p_Tx_NullStop2Done refers to timer for end of null flits at active lanes to potential start of a new width change at transmitter, L0p_Rx_Enter2Tran refers to timer for end of PM flits to start of dropped flits at receiver, L0p_Rx_Tran2Unblock refers to timer for start of dropped flits to end of dropped flits at receiver, and L0p_Rx_Unblock2Done refers to timer for start of flits at new width to ready for width change at receiver.

In an embodiment, specified requirements on the timers (which may be implemented in LWM logic 120 in an embodiment) ensure that flits continue to be transmitted (non-blocking) during width changes on the two sides with no data flits being lost even when flit structures with enhanced error detection capabilities such as rolling CRC are enabled. The timing diagrams also show the signaling on the idle lanes that allows probes (e.g., electro-magnetic coupler probes) to initialize themselves before the lanes start carrying flits. In an embodiment, this signaling can be used to allow for additional conditioning (e.g., calibration, compensation, etc.) of the idle lanes prior to carrying flits. The timing diagrams further illustrate staggered differential DC tails when lanes enter electrical idle—this may be used to turn off some circuits (including for example equalizers) in a staggered manner. An embodiment additionally specifies time limits (retraining interval) on lanes staying idle so that bit lock is not lost on these lanes. As shown, non-idle flits continue to be sent after the Power Management (PM) flit.

The timing diagrams further show transmission of null flits prior to the width transition—this period may be used for evaluating/re-adaptation/reconfiguration of one or more of the link lanes by active mechanisms (which may create bit errors) since these flits are not used by the link layer. In another embodiment, the width may stay unchanged and the null period evaluation may be used for proactively identifying one or more marginal lanes of the link (e.g., lanes that are not operating at full and symmetric eye opening or otherwise in accordance with the full specification) and for hardware reconfiguration, e.g., without having to quiesce the whole system. Yet another embodiment may keep the link width the same but hop to a different set of lanes in the null flit period, e.g., data transmission on a first set of lanes of the link are to be shifted to a second set of lanes of the link during a period corresponding to transmission of the null flits over the link.

Figure 7:
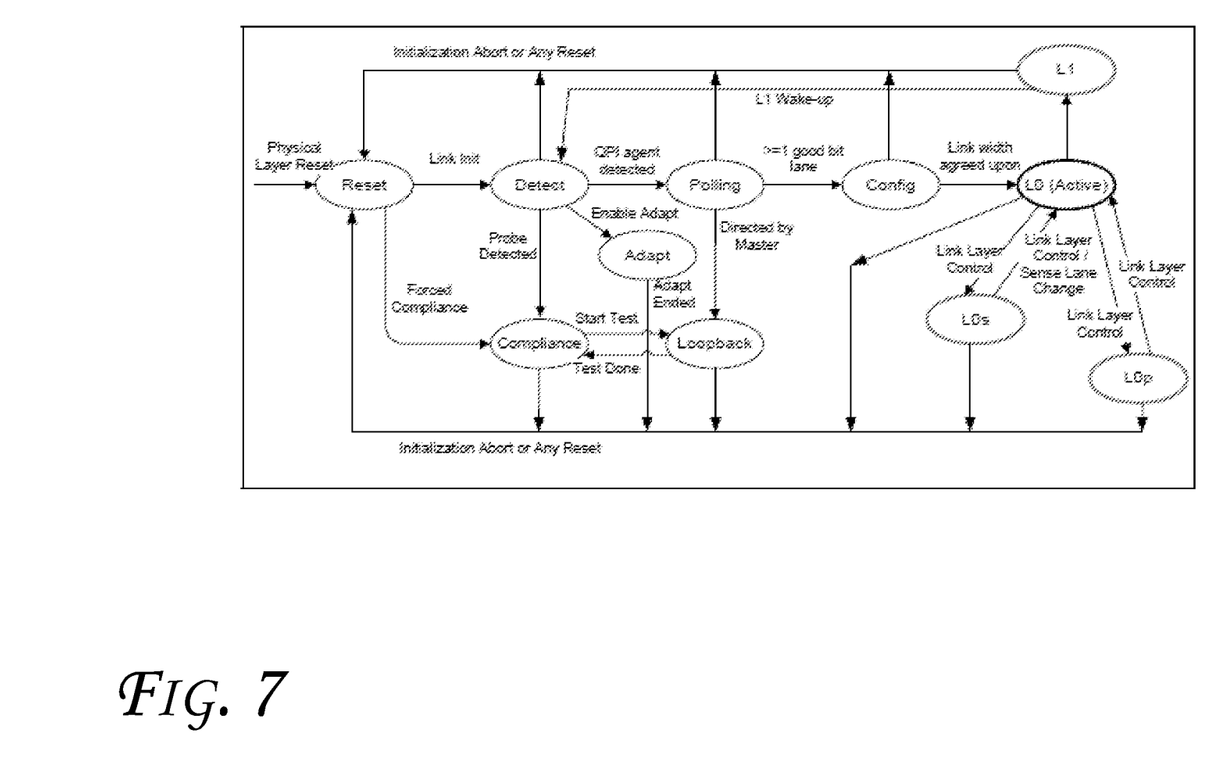
FIG. 7 illustrates a state diagram in accordance with an embodiment of the invention.

FIG. 7 illustrates a state diagram in accordance with an embodiment. The state diagram of FIG. 7 shows the L0p state where the LWM logic 120 is used. The L0p includes various sub-states and timers that may be implemented by the Link Width Modulation (LWM) logic 120 discussed with reference to FIGS. 3-6.

Figure 8:
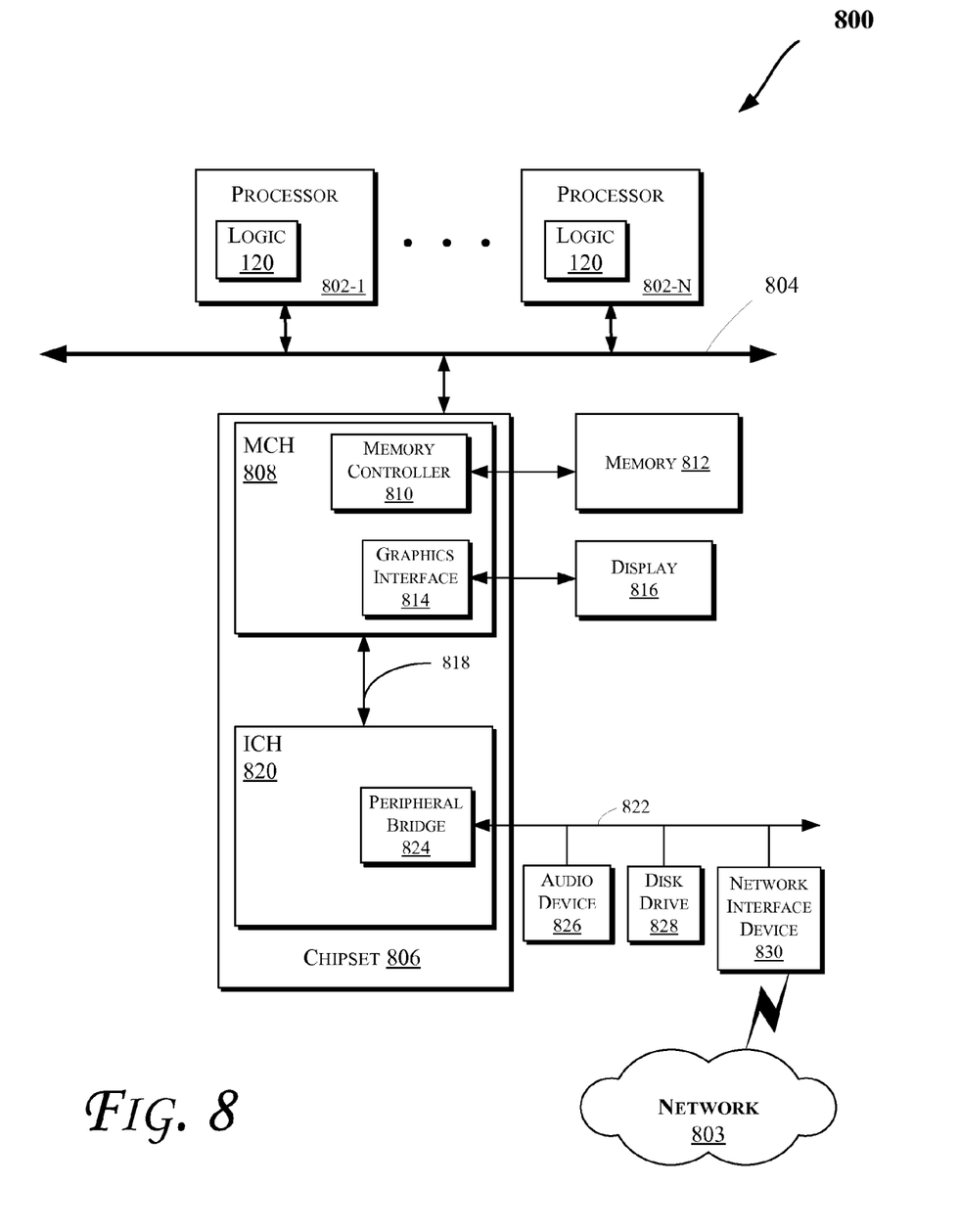

FIG. 8 illustrates a block diagram of a computing system 800 in accordance with an embodiment of the invention. The computing system 800 may include one or more central processing unit(s) (CPUs) 802-1 through 802-N or processors (collectively referred to herein as "processors 802" or more generally "processor 802") that communicate via an interconnection network (or bus) 804. The processors 802 may include a general purpose processor, a network processor (that processes data communicated over a computer network 803), or other types of a processor (including a reduced instruction set computer (RISC) processor or a complex instruction set computer (CISC)). Moreover, the processors 802 may have a single or multiple core design. The processors 802 with a multiple core design may integrate different types of processor cores on the same integrated circuit (IC) die. Also, the processors 802 with a multiple core design may be implemented as symmetrical or asymmetrical multiprocessors. Also, the operations discussed with reference to FIGS. 1-7 may be performed by one or more components of the system 800. In some embodiments, the processors 802 may be the same or similar to the processors 202-208 of FIG. 2. Furthermore, the processors 802 may include the LWM logic 120.

A chipset 806 may also communicate with the interconnection network 804. In an embodiment, the chipset 806 may include LWM logic 120. The chipset 806 may include a memory controller hub (MCH) 808. The MCH 808 may include a memory controller 810 that communicates with a memory 812. The memory 812 may store data, including sequences of instructions that are executed by the CPU 802, or any other device included in the computing system 800. For example, the memory 812 may store data corresponding to an operation system (OS). In one embodiment of the invention, the memory 812 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 804, such as multiple CPUs and/or multiple system memories.

Additionally, one or more of the processors 802 may have access to one or more caches (which may include private and/or shared caches in various embodiments) and associated cache controllers (not shown). The cache(s) may adhere to one or more cache coherent protocols. The cache(s) may store data (e.g., including instructions) that are utilized by one or more components of the system 800. For example, the cache may locally cache data stored in a memory 812 for faster access by the components of the processors 802. In an embodiment, the cache (that may be shared) may include a mid-level cache and/or a last level cache (LLC). Also, each processor 802 may include a level 1 (L1) cache. Various components of the processors 802 may communicate with the cache directly, through a bus or interconnection network, and/or a memory controller or hub. Also, each of the processors 802 (or each core present in the processors 802) may include the LWM logic 120 in some embodiments.

The MCH 808 may also include a graphics interface 814 that communicates with a display device 816, e.g., via a graphics accelerator. In one embodiment of the invention, the graphics interface 814 may communicate with the graphics accelerator via an accelerated graphics port (AGP). In an embodiment of the invention, the display 816 (such as a flat panel display) may communicate with the graphics interface 814 through, for example, a signal converter that translates a digital representation of an image stored in a storage device such as video memory or system memory into display signals that are interpreted and displayed by the display 816. The display signals produced by the display device may pass through various control devices before being interpreted by and subsequently displayed on the display 816.

A hub interface 818 may allow the MCH 808 and an input/output control hub (ICH) 820 to communicate. The ICH 820 may provide an interface to I/O devices that communicate with the computing system 800. The ICH 820 may communicate with a bus 822 through a peripheral bridge (or controller) 824, such as a peripheral component interconnect (PCI) bridge, a universal serial bus (USB) controller, or other types of peripheral bridges or controllers. The bridge 824 may provide a data path between the CPU 802 and peripheral devices. Other types of topologies may be utilized. Also, multiple buses may communicate with the ICH 820, e.g., through multiple bridges or controllers. Moreover, other peripherals in communication with the ICH 820 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 822 may communicate with an audio device 826, one or more disk drive(s) 828, and a network interface device 830 (which is in communication with the computer network 803). Other devices may communicate via the bus 822. Also, various components (such as the network interface device 830) may communicate with the MCH 808 in some embodiments of the invention. In addition, the processor 802 and one or more components of the MCH 808 may be combined to form a single chip.

Furthermore, the computing system 800 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 828), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 9:
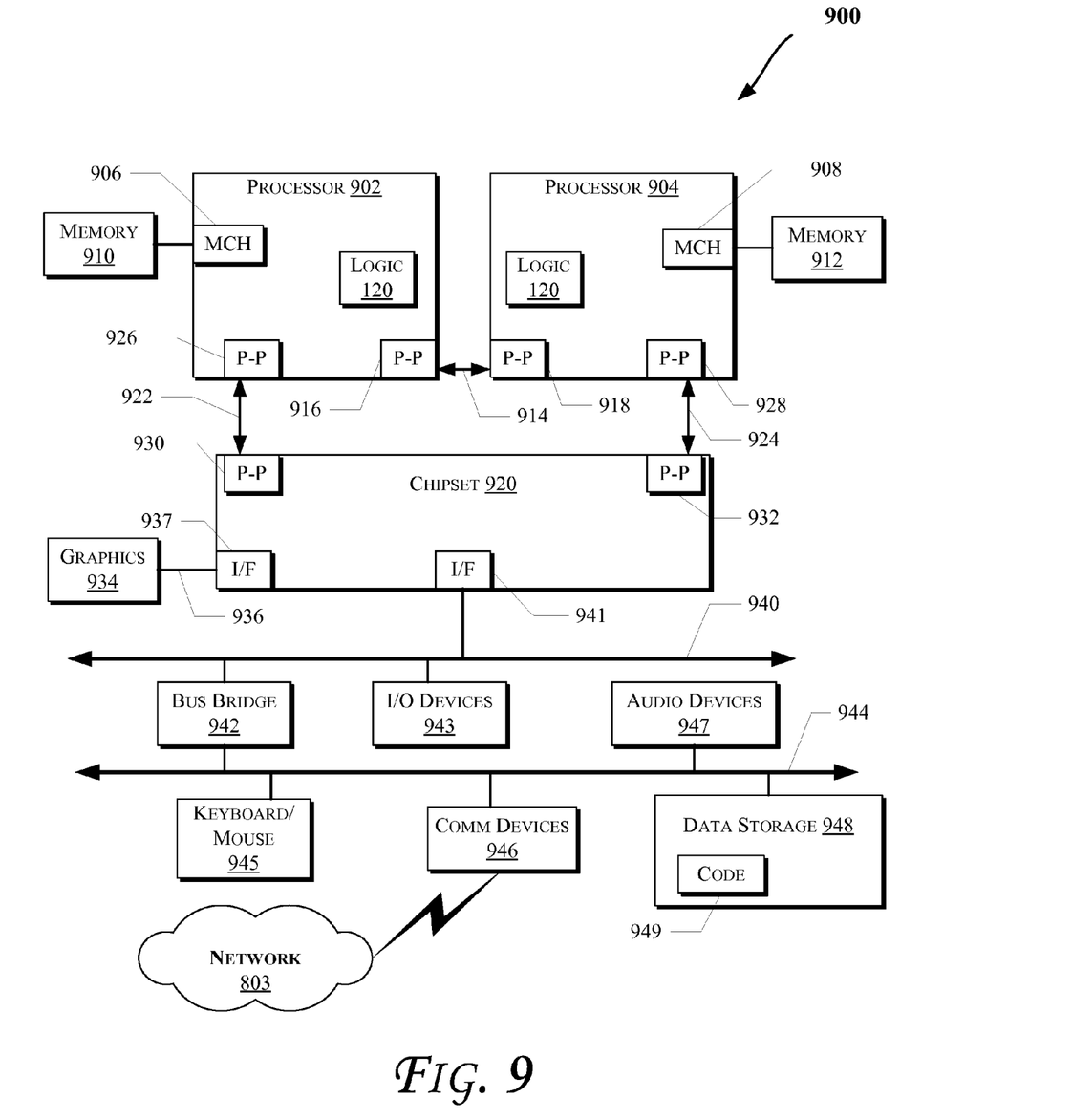

FIG. 9 illustrates a computing system 900 that is arranged in a point-to-point (PtP) configuration, according to an embodiment of the invention. In particular, FIG. 9 shows a system where processors, memory, and input/output devices are interconnected by a number of point-to-point interfaces. The operations discussed with reference to FIGS. 1-8 may be performed by one or more components of the system 900.

As illustrated in FIG. 9, the system 900 may include several processors, of which only two, processors 902 and 904 are shown for clarity. The processors 902 and 904 may each include a local memory controller hub (MCH) 906 and 908 to enable communication with memories 910 and 912. The memories 910 and/or 912 may store various data such as those discussed with reference to the memory 812 of FIG. 8. As shown in FIG. 9, the processors 902 and 904 may also include the cache(s) discussed with reference to FIG. 8.

In an embodiment, the processors 902 and 904 may be one of the processors 802 discussed with reference to FIG. 8. The processors 902 and 904 may exchange data via a point-to-point (PtP) interface 914 using PtP interface circuits 916 and 918, respectively. Also, the processors 902 and 904 may each exchange data with a chipset 920 via individual PtP interfaces 922 and 924 using point-to-point interface circuits 926, 928, 930, and 932. The chipset 920 may further exchange data with a high-performance graphics circuit 934 via a high-performance graphics interface 936, e.g., using a PtP interface circuit 937.

At least one embodiment of the invention may be provided within the processors 902 and 904 or chipset 920. For example, the LWM logic 120 may be provided within the processors 902 and 904 (or within each core of the processors 902 and/or 904). Other embodiments of the invention, however, may exist in other circuits, logic units, or devices within the system 900 of FIG. 9. Furthermore, other embodiments of the invention may be distributed throughout several circuits, logic units, or devices illustrated in FIG. 9.

The chipset 920 may communicate with a bus 940 using a PtP interface circuit 941. The bus 940 may have one or more devices that communicate with it, such as a bus bridge 942 and I/O devices 943. Via a bus 944, the bus bridge 942 may communicate with other devices such as a keyboard/mouse 945, communication devices 946 (such as modems, network interface devices, or other communication devices that may communicate with the computer network 803), audio I/O device, and/or a data storage device 948. The data storage device 948 may store code 949 that may be executed by the processors 902 and/or 904.

In various embodiments of the invention, the operations discussed herein, e.g., with reference to FIGS. 1-9, may be implemented as hardware (e.g., circuitry), software, firmware, microcode, or combinations thereof, which may be provided as a computer program product, e.g., including a (e.g., non-transitory) machine-readable or (e.g., non-transitory) computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-9. Additionally, such computer-readable media may be downloaded as a computer program product, wherein the program may be transferred from a remote computer (e.g., a server) to a requesting computer (e.g., a client) by way of data signals transmitted via a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A processor comprising:
a first agent;
a second agent coupled to the first agent via a link, wherein the link is to transition from a first width to a second width in response to a power management flit and wherein non-idle flits continue to be transmitted over the link after transmission of the power management flit, wherein null flits are to be transmitted over the link prior to transmission at the second width, wherein one or more lanes of the link are to be evaluated or reconfigured during a period corresponding to transmission of the null flits over the link.

2. The processor of claim 1, wherein one or more marginal lanes of the link are to be identified during a period corresponding to transmission of the null flits over the link.

3. The processor of claim 1, wherein data transmission on a first set of lanes of the link are to be shifted to a second set of lanes of the link during a period corresponding to transmission of the null flits over the link.

4. The processor of claim 1, wherein the link, operating at the second width, is to be available for data transmission while enhanced error detection capability is enabled.

5. The processor of claim 4, wherein the enhanced error detection capability comprises a rolling CRC (Cyclic Redundancy Code) error detection capability.

6. The processor of claim 1, wherein the link is to support one or more of: a probe, retraining, and circuit conditioning.

7. The processor of claim 6, wherein the probe is to comprise an electro-magnetic coupler probe.

8. The processor of claim 6, wherein a width of the link is changed in response to a time limit to ensure bit lock maintenance on the link.

9. The processor of claim 6, wherein timed signaling allows for turning off of circuits in a staggered manner and turning on and conditioning of circuits in a staggered manner.

10. The processor of claim 1, wherein the link is to comprise a point-to-point interconnect.

11. The processor of claim 1, wherein the processor is to comprise a plurality of processor cores.

12. The processor of claim 1, wherein the processor is to be coupled to a plurality of agents.

13. A method comprising:
transmitting a power management flit from a first agent to a second agent over a link;
modifying the link from a first width to a second width in response to the power management flit, wherein non-idle flits continue to be transmitted over the link after transmission of the power management flit;
transmitting null flits over the link prior to transmission of the second width; and
evaluating or reconfiguring one or more lanes of the link during a period corresponding to transmission of the null flits over the link.

14. The method of claim 13, further comprising identifying one or more marginal lanes of the link during a period corresponding to transmission of the null flits over the link.

15. The method of claim 13, further comprising shifting data transmission from a first set of lanes of the link to a second set of lanes of the link during a period corresponding to transmission of the null flits over the link.

16. The method of claim 13, further comprising, while operating the link at the second width, making the link available for data transmission while enhanced error detection capability is enabled.

17. The method of claim 13, further comprising the link supporting one or more of: a probe, retraining, and circuit conditioning.

18. The method of claim 17, wherein the probe is to comprise an electro-magnetic coupler probe, a width of the link is changed in response to a time limit to ensure bit lock maintenance on the link, and timed signaling allows for turning off of circuits in a staggered manner and turning on and conditioning of circuits in a staggered manner.

19. The method of claim 13, wherein the link is to comprise a point-to-point interconnect.

20. A computing system comprising:
a first processor core and a second processor core;
a point-to-point link to couple the first and second processor cores; and logic to manage width modulation of the link, wherein the logic is to cause the link to transition from a first width to a second width in response to a power management flit and wherein non-idle flits continue to be transmitted over the link after transmission of the power management flit, wherein null flits are to be transmitted over the link prior to transmission at the second width, wherein one or more lanes of the link are to be evaluated or reconfigured during a period corresponding to transmission of the null flits over the link.

21. The system of claim 20, wherein the link, operating at the second width, is to be available for data transmission while enhanced error detection capability is enabled.

22. The system of claim 20, wherein the link is to support one or more of: a probe, retraining, and circuit conditioning.

23. The system of claim 22, wherein the probe is to comprise an electro-magnetic coupler probe.

24. The system of claim 22, wherein a width of the link is changed in response to a time limit to ensure bit lock maintenance on the link.

25. The system of claim 22, wherein timed signaling allows for turning off of circuits in a staggered manner and turning on and conditioning of circuits in a staggered manner.

26. A processor comprising:
a first agent;
a second agent coupled to the first agent via a link, wherein the link is to transition from a first width to a second width in response to a power management flit and wherein non-idle flits continue to be transmitted over the link after transmission of the power management flit, wherein one or more marginal lanes of the link are to be identified during a period corresponding to transmission of the null flits over the link.

27. The processor of claim 26, wherein null flits are to be transmitted over the link prior to transmission at the second width.

28. The processor of claim 27, wherein one or more lanes of the link are to be evaluated or reconfigured during a period corresponding to transmission of the null flits over the link.

29. A processor comprising:
a first agent;
a second agent coupled to the first agent via a link, wherein the link is to transition from a first width to a second width in response to a power management flit and wherein non-idle flits continue to be transmitted over the link after transmission of the power management flit, wherein the link is to support one or more of: a probe, retraining, and circuit conditioning, wherein the probe is to comprise an electro-magnetic coupler probe, wherein a width of the link is changed in response to a time limit to ensure bit lock maintenance on the link.

30. The processor of claim 29, wherein timed signaling allows for turning off of circuits in a staggered manner and turning on and conditioning of circuits in a staggered manner.

31. The processor of claim 29, wherein null flits are to be transmitted over the link prior to transmission at the second width.

* * * * *